J. N. BROKAW.
ODOMETER.

No. 183,898. Patented Oct. 31, 1876.

WITNESSES
Henry N. Miller
C. L. Evert

INVENTOR
Jno. N. Brokaw.
J. H. Alexander
ATTORNEY

UNITED STATES PATENT OFFICE.

JOHN N. BROKAW, OF OVID, MICHIGAN.

IMPROVEMENT IN ODOMETERS.

Specification forming part of Letters Patent No. 183,898, dated October 31, 1876; application filed September 23, 1876.

*To all whom it may concern:*

Be it known that I, JOHN H. BROKAW, of Ovid, in the county of Clinton and State of Michigan, have invented certain new and useful Improvements in Odometers or Mile-Indicators; and I do hereby declare that the following is a full, clear, and exact description thereof, reference being had to the accompanying drawings, and to the letters of reference marked thereon, which form part of this specification.

The nature of my invention consists in the construction and arrangement of an odometer, or machine for measuring the distance a vehicle travels, as will be hereinafter more fully set forth.

In order to enable others skilled in the art to which my invention appertains to make and use the same, I will now proceed to describe its construction and operation, referring to the annexed drawing, in which—

Figure 3:
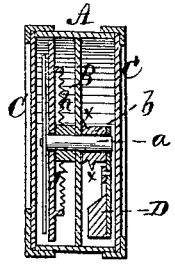
Figure 1:
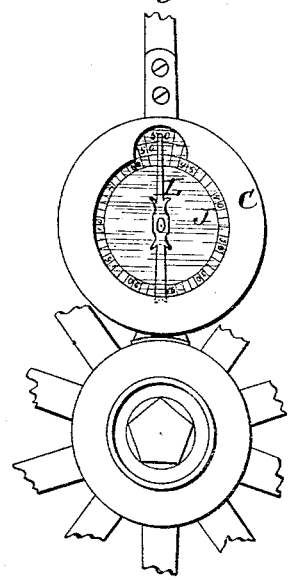
Figure 2:
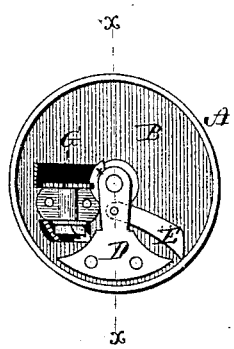
Figure 4:
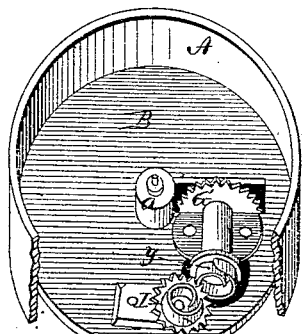
Figure 5:
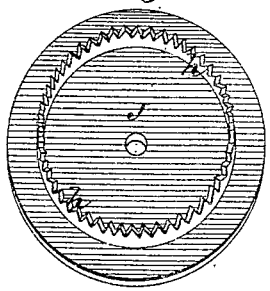

Figure 1 is a front view of my machine. Fig. 2 is a rear view of the same. Fig. 3 is a section through the line $x\ x$, Fig. 2. Figs. 4 and 5 are detached views.

A represents a circular band or case, provided with a center partition, B, and with glass lids C C at both ends. Through the center of the partition B passes a post or shaft, $a$, which is rigidly attached thereto. On the rear end of the shaft or post $a$ is placed a hub, $b$, from which depends a weighted arm, D, and to this arm is pivoted a friction-dog, E, to check the swaying of the weight as the wheel revolves to which the machine is fastened. On the hub $b$ is formed a worm, $x$, which engages with a cog-wheel, G, on the end of a short shaft, which has suitable bearings in the partition B. On the other end of this shaft is a worm, $y$, which projects through a slot in the partition B, and engages with a cog-wheel, I. On this wheel is another worm, $z$, which engages with a toothed or cogged rim, $h$, secured to the back of the dial J, said dial being placed loosely upon the front end of the post $a$, and held from coming off by the hand or index L, rigidly attached to said post.

The machine thus constructed may be attached, in any suitable manner, to any desired part of a wheel, and as the wheel revolves the weight D hangs downward, and by means of the worm-gearing, as described, the dial J is rotated according to the number of revolutions made by the wheel, so that the stationary index will always show the distance traveled.

The friction-dog E prevents all backward swaying of the weight.

Having thus fully described my invention, what I claim as new, and desire to secure by Letters Patent, is—

1. In an odometer, the combination of the hub $b$, with worm $x$, the weight D, and friction-dog E, as and for the purposes herein set forth.

2. The combination of the weight D with friction-dog E, the worm $x$, cog-wheel G, worm $y$, cog-wheel I with worm $z$, the dial J with cogged rim $h$, and the stationary index L, all constructed as described, and arranged within a suitable case, substantially as and for the purposes herein set forth.

In testimony that I claim the foregoing as my own I affix my signature in presence of two witnesses.

JOHN N. BROKAW.

Witnesses:
 SQUIRE GUILE,
 S. B. LEDDICK.